(12) United States Patent
Shih et al.

(10) Patent No.: US 10,133,380 B2
(45) Date of Patent: Nov. 20, 2018

(54) TOUCH DISPLAY DEVICE AND DRIVING METHOD THEREOF

(71) Applicant: FocalTech Systems Co., Ltd., Hsinchu (TW)

(72) Inventors: Po-Sheng Shih, Hsinchu (TW); Chien-Yung Cheng, Hsinchu (TW)

(73) Assignee: FOCALTECH SYSTEMS CO., LTD., Hsinchu (TW)

( * ) Notice: Subject to any disclaimer, the term of this patent is extended or adjusted under 35 U.S.C. 154(b) by 106 days.

(21) Appl. No.: 15/148,904

(22) Filed: May 6, 2016

(65) Prior Publication Data

US 2017/0123540 A1 May 4, 2017

Related U.S. Application Data

(60) Provisional application No. 62/247,210, filed on Oct. 28, 2015.

(30) Foreign Application Priority Data

Dec. 25, 2015 (TW) .................................. 104143706

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0414* (2013.01); *G06F 3/0416* (2013.01); *G06F 2203/04106* (2013.01); *G06F 2203/04107* (2013.01); *G06F 2203/04112* (2013.01)

(58) Field of Classification Search
CPC .................. G06F 3/0414; G06F 3/044; G06F 2203/04103; G06F 2203/04105
See application file for complete search history.

(56) References Cited

U.S. PATENT DOCUMENTS

| | | | |
|---|---|---|---|
| 2009/0256821 A1 | 10/2009 | Mamba | |
| 2009/0315858 A1 | 12/2009 | Sato | |
| 2010/0182273 A1 | 7/2010 | Noguchi | |
| 2012/0062511 A1 | 3/2012 | Ishizaki | |
| 2012/0218199 A1 | 8/2012 | Kim | |
| 2014/0333582 A1* | 11/2014 | Huo | G02F 1/13338 345/174 |

(Continued)

FOREIGN PATENT DOCUMENTS

CN 103455202 A 12/2013

*Primary Examiner* — Yuzhen Shen
(74) *Attorney, Agent, or Firm* — Muncy, Geissler, Olds & Lowe, P.C.

(57) ABSTRACT

A touch display device including a first substrate, a second substrate, a display medium layer, a pixel electrode layer, a touch electrode structure, and a force-sensing layer is provided. The second substrate is opposite to the first substrate. The display medium layer is disposed between the first substrate and the second substrate. The pixel electrode layer is disposed between the display medium layer and the first substrate. The touch electrode structure is disposed on the second substrate and includes a driving electrode layer and a touch-sensing layer. The force-sensing layer is disposed on the first substrate, and a variable gap exists between the force-sensing layer and the driving electrode layer. A driving method of the touch display device is also provided.

19 Claims, 18 Drawing Sheets

(56) References Cited

U.S. PATENT DOCUMENTS

| | | | |
|---|---|---|---|
| 2015/0153942 A1* | 6/2015 | Kim | G06F 3/04847 |
| | | | 715/846 |
| 2015/0177884 A1* | 6/2015 | Han | G06F 3/044 |
| | | | 345/174 |
| 2015/0370396 A1* | 12/2015 | Hotelling | G06F 3/0414 |
| | | | 345/174 |
| 2016/0357292 A1* | 12/2016 | Suzuki | G06F 3/0412 |
| 2017/0031509 A1* | 2/2017 | Yoon | G06F 3/044 |
| 2017/0060340 A1* | 3/2017 | Chen | G06F 3/0412 |
| 2017/0068368 A1* | 3/2017 | Hsiao | G06F 3/0416 |
| 2017/0235414 A1* | 8/2017 | Ding | G06F 3/0416 |
| | | | 345/174 |

* cited by examiner

TOUCH DISPLAY DEVICE AND DRIVING METHOD THEREOF

CROSS-REFERENCE TO RELATED APPLICATIONS

The present application claims the benefit of the U.S. provisional application Ser. No. 62/247,210, filed on Oct. 28, 2015, and the TW patent application serial no. 104143706, filed on Dec. 25, 2015, all of which are incorporated herein by reference in their entireties.

TECHNICAL FIELD

The present invention relates to a touch display device and driving method thereof, and particularly to a touch display device having in-cell sensing elements and driving method thereof.

BACKGROUND

Touch-sensing capacity has become necessary requirement for electronic products in the up-to-date consuming market. Integrating the touch-sensing capacity with the displaying function allows these electronic products to perform desired functions when users directly touch the display screen. Such touch display devices therefore provide the users with more visual and convenient way in manipulation. However, the rapid development of application programs and rise of the wearable touch display devices push the demand of the market to go beyond the need for the electronic devices having only the display and touch position-sensing functions. The touch-sensing capacity can be multiplex by having an extra function of sensing force-touch at the touch position to accomplish more models of manipulation.

Nowadays, most of the touch display devices have force sensors attached under the display panel to perform the force sensing function. However, this technic easily increases the thickness of the whole touch display device and the manufacturing cost, and incurs reliability issues.

SUMMARY

The present disclosure provides a touch display device to improve the abovementioned issues in thickness, manufacturing cost, and reliability aspects. The present disclosure also provides a driving method of the touch display device.

In accordance with an exemplary embodiment of the present disclosure, a touch display device includes a first substrate, a second substrate arranged to opposite face the first substrate, a display medium layer disposed between the first substrate and the second substrate, a pixel electrode layer disposed between the display medium layer and the first substrate, a touch electrode structure disposed on the second substrate with a driving electrode layer and a touch-sensing layer being included, and a force-sensing layer disposed on the first substrate, wherein a variable gap exists between the force-sensing layer and the driving electrode layer.

In accordance with another exemplary embodiment of the present disclosure, a driving method of touch display device comprises the following steps/methods. Providing a touch display device including a first substrate, a second substrate, a display medium layer, a pixel electrode layer, a touch electrode structure, and a force-sensing layer, in which the second substrate opposite faces the first substrate, the display medium layer is disposed between the first substrate and the second substrate, the pixel electrode layer is disposed between the display medium layer and the first substrate, the touch electrode structure is disposed on the second substrate and includes a driving electrode layer and a touch-sensing layer, the force-sensing layer is disposed on the first substrate, a variable gap exists between the force-sensing layer and the driving electrode layer, and the touch display device includes a display mode, a touch-sensing mode, and a force-sensing mode; and implementing one of the display mode, the touch-sensing mode, and the force-sensing mode in a screen frame time period.

The touch display device in accordance with each embodiment of the present invention disposes the sensing elements including the touch electrode structure and/or the force-sensing layer inside the touch display device to form an in-cell sensing device, and thus not only raises the reliability of the entire device but also effectively reduces the thickness and manufacturing cost of the touch display devices. A driving method of the touch display devices is also disclosed.

Various other objects, advantages and features of the present invention will become readily apparent from the ensuing detailed description accompanying drawings, and the novel features will be particularly pointed out in the appended claims.

BRIEF DESCRIPTION OF DRAWINGS

The following detailed descriptions, given by way of example, and not intended to limit the present invention solely thereto, will be best be understood in conjunction with the accompanying figures.

DETAILED DESCRIPTION OF THE EMBODIMENTS

Figure 1A:
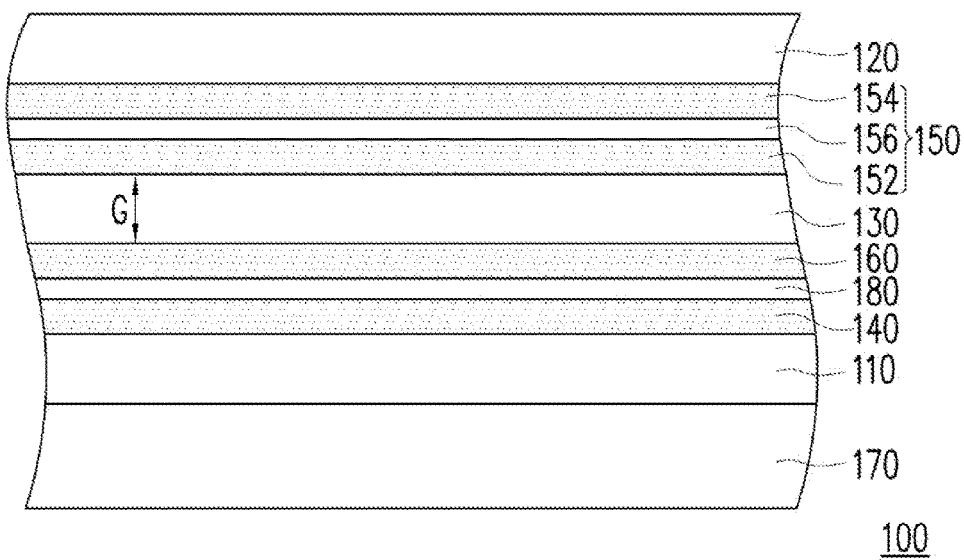
FIG. 1A is a cross-sectional view of the touch display device in accordance with a first exemplary embodiment of the claimed invention.
Figure 1B:
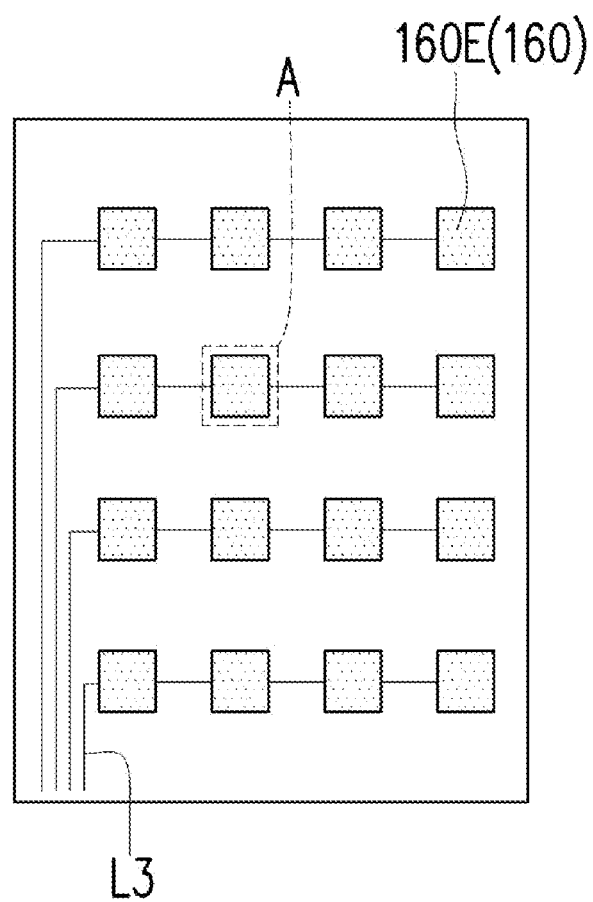
FIG. 1B to FIG. 1D are first kind of top views respectively illustrating force-sensing layer, driving electrode layer, and touch-sensing layer of the FIG. 1A.
Figure 1C:
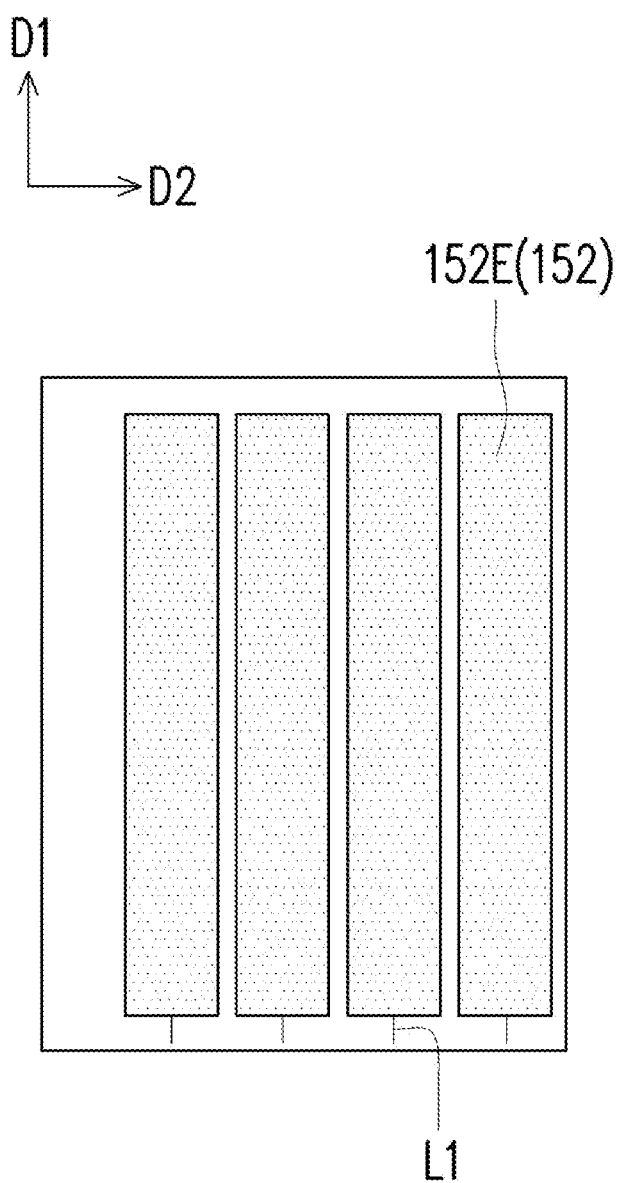
Figure 1D:
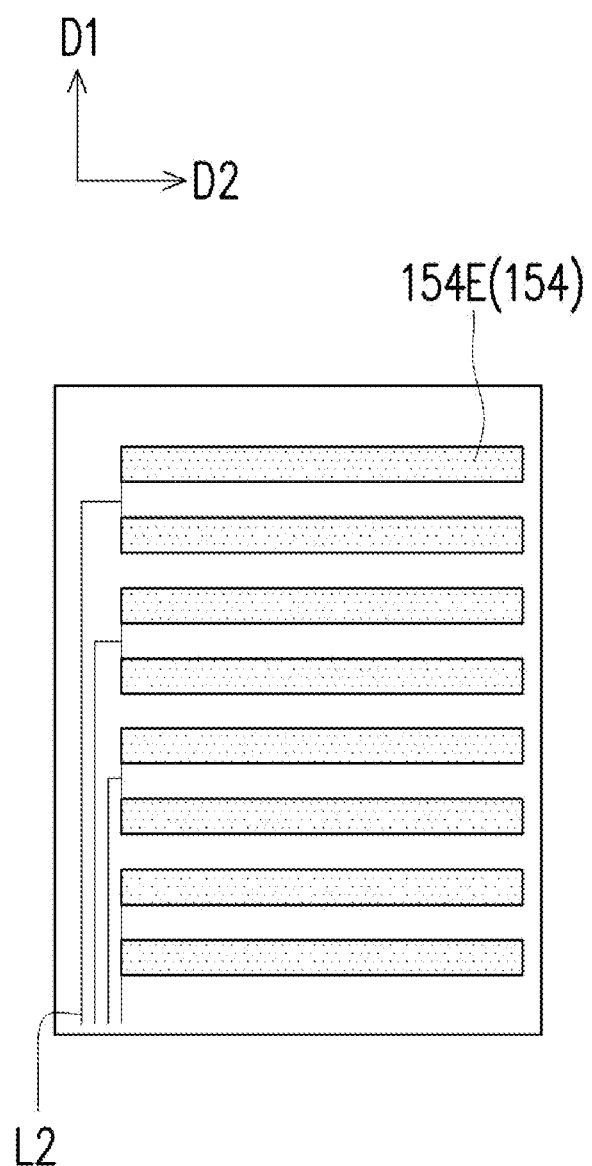
Figure 1E:
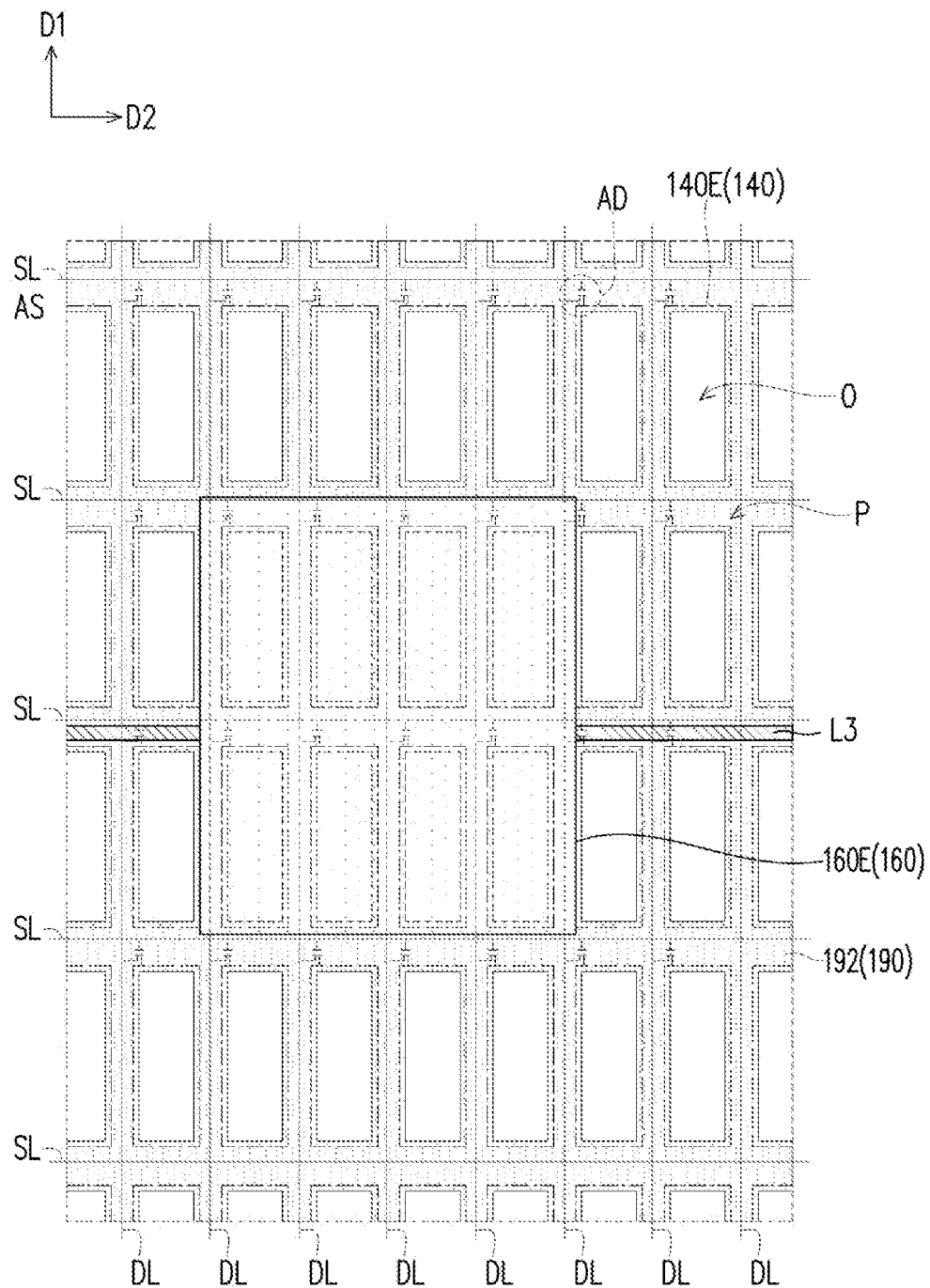
FIG. 1E is an enlarged view schematically illustrating the area "A" in the FIG. 1B.
Figure 1F:
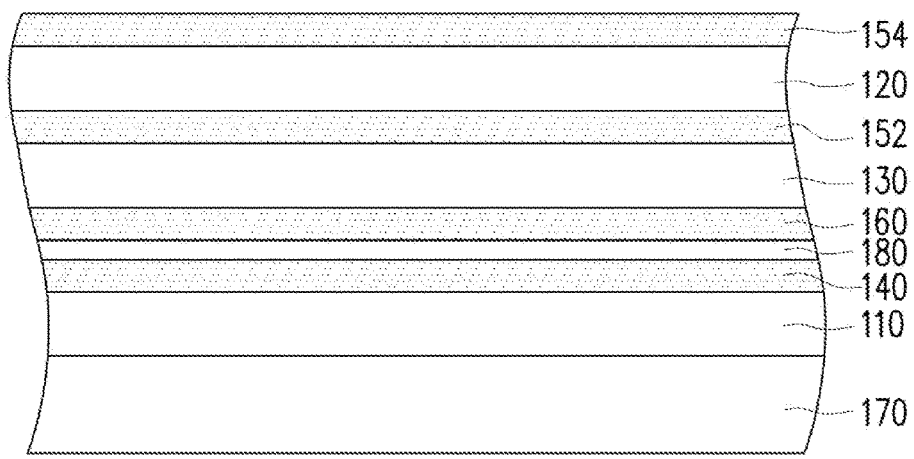
FIG. 1F is a cross-sectional view of another touch display device in accordance with the first exemplary embodiment of the claimed invention.

FIG. 1A is a cross-sectional view of the touch display device in accordance with a first exemplary embodiment of the claimed invention. FIG. 1B to FIG. 1D are first kind of top views respectively illustrating force-sensing layer, driving electrode layer, and touch-sensing layer of the FIG. 1A. FIG. 1E is an enlarged view schematically illustrating the area "A" in the FIG. 1B. FIG. 1F is a cross-sectional view of another touch display device in accordance with the first exemplary embodiment of the claimed invention.

Referring to FIG. 1A, the touch display device 100 includes a first substrate 110, a second substrate 120, a display medium layer 130, a pixel electrode layer 140, a touch electrode structure 150, and a force-sensing layer 160. The second substrate 120 and the first substrate 110 are arranged in an opposite face-to-face manner. The display medium layer 130 is disposed between the first substrate 110 and the second substrate 120. The pixel electrode layer 140 is disposed between the display medium layer 130 and the first substrate 110. The touch electrode structure 150 is disposed on the second substrate 120 and includes a driving electrode layer 152 and a touch-sensing layer 154. The force-sensing layer 160 is disposed on the first substrate 110, and there is a variable gap G between the force-sensing layer 160 and the driving electrode layer 152.

Furthermore, either of the first substrate 110 and the second substrate 120 may be made of, but not limited to, glass, plastic, or composite material. The distance between the first substrate 110 and the second substrate 120 may be changed due to the press of a user on the touch display device 100, and thus results in change of the variable gap G between the force-sensing layer 160 and the driving electrode layer 152. In one embodiment, at least one spacer (not shown) may be disposed between the first substrate 110 and the second substrate 120 to avoid excess compression of the distance between the first substrate 110 and the second substrate 120 and therefore maintain the distance in a suitable range. In another embodiment, a plurality of kinds of spacers with different heights (not shown) may be disposed between the first substrate 110 and the second substrate 120 such that one kind of the spacers supports against the first substrate 110 and the second substrate 120 while another kind of the spacers supports against only one of the first substrate 110 and the second substrate 120, and thereby allows change of the distance between the first substrate 110 and the second substrate 120 when the touch display device 100 is applied with an external force.

In one embodiment, the display medium layer 130 may be made of non-solid materials such as liquid crystal materials, electrophoretic materials, electro-wetting materials or the combination thereof. Therefore, the variable gap G may be changed by pressing the touch display device 100. In another embodiment, the display medium layer 130 may be made of solid materials such as organic light-emitting material or semiconductor material. Furthermore, there may be a space existing between the display medium layer 130 and the first substrate 110 to allow change of the variable gap G when a user press the touch display device 100. In another embodiment, the touch display device 100 may include a backlight module 170 to provide light sources required for display when the display medium layer 130 is made of non-self-luminous material. In this way, the first substrate 110 may be disposed between the second substrate 120 and the backlight module 170. Alternatively, the backlight module 170 may be saved when the display medium layer 130 is made of self-luminous material.

The touch electrode structure 150 and the force-sensing layer 160 may be disposed on different substrates and at two opposed sides of the display medium layer 130. As shown in FIG. 1A, the pixel electrode layer 140 and the force-sensing layer 160 are disposed on the first substrate 110 while the touch electrode structure 150 is disposed on the second substrate 120.

The pixel electrode layer 140 and the force-sensing layer 160 may, but not limited to, be formed on the first substrate 110 in sequences such that the pixel electrode layer 140 is disposed between the force-sensing layer 160 and the first substrate 110. In one embodiment, the pixel electrode layer 140 may be formed after formation of the force-sensing layer 160 to accomplish the above-mentioned disposition. The touch display device 100 may further include an insulating layer 180. The insulating layer 180 may be disposed between the pixel electrode layer 140 and the force-sensing layer 160 to electrically isolate the pixel electrode layer 140 and the force-sensing layer 160.

The force-sensing layer 160 may be used together with other elements to form an electric field for driving the display medium layer 130 and therefore to perform display function. Specifically, a display mode of the touch display device 100 may be performed when a display driving waveform is supplied to the pixel electrode layer 140 and a common voltage is supplied to the force-sensing layer 160. The driving electrode layer 152 may influence the electric field for driving the display medium layer 130 since it is disposed near the display medium layer 130. To avoid this influence in the display mode, the driving electrode layer 152 may be supplied with a common voltage.

Referring to FIGS. 1B and 1E, the pixel electrode layer 140 may include a plurality of pixel electrodes 140E, which are driven independently to perform display function. The touch display device 100 may further include a plurality of scanning lines SL, a plurality of data lines DL, and a plurality of active elements AD. The scanning lines SL and the data lines DL are electrically isolated with each other and disposed in a staggered manner to form a plurality of sub-pixel regions P. Each of the sub-pixel regions P is disposed with at least one pixel electrode 140E and at least one active element AD with each active element AD connecting with a corresponding pixel electrode 140E, a corresponding scanning line SL, and a corresponding data line DL. In a display mode, the display function may be performed by supplying driving waveforms to each of the scanning lines SL to switch on the corresponding active element AD, and supplying display driving waveforms to each pixel electrode 140E via the data lines DL.

The force-sensing layer 160 may include a plurality of force-sensing electrodes 160E. In one embodiment, the force-sensing electrodes 160E are not only used for sensing force but also served as common electrodes in a display mode. The determination of the resolution of the force-sensing electrodes 160E depends on the design requirement. Compared with a pixel electrode 140E, a force-sensing electrode 160E can be designed to be larger in size and cover a plurality of pixel electrodes 140E such that each of the force-sensing electrodes 160E overlaps a plurality of (e.g. two or more than two) pixel electrodes 140E.

Referring to FIG. 1E, the pixel electrodes 140E and the force-sensing electrodes 160 may be made of light-permeable and electrically conductive materials or electrically conductive layers with enough light transparency. The light-permeable and electrically conductive materials may include, but not limited to, metal oxides such as indium tin oxide, indium oxide, or tin oxide. The electrically conductive layers with enough light transparency may include, but not limited to, metal mesh layers such as nano-silver wires.

The touch-sensing layer 154 and the driving electrode layer 152 may be formed on the second substrate 120 in sequences, and the driving electrode layer 152 may be disposed between the touch-sensing layer 154 and the display medium layer 130. The touch electrode structure 150 may further include an insulating layer 156. The insulating layer 156 may be disposed between the driving electrode layer 152 and the touch-sensing layer 154 to electrically isolate the driving electrode layer 152 and the touch-sensing layer 154. In another embodiment, the driving electrode layer 152 and the touch-sensing layer 154 may be disposed on two opposite surfaces of the second substrate 120, respectively, such as shown in FIG. 1F. For an example, the touch-sensing layer 154 may be disposed on one side of the second substrate 120 that is distant from the display medium layer 130. In this case, the insulating layer 156 may be saved. In another embodiment, the driving electrode layer 152 and the touch-sensing layer 154 may be disposed on the same side and the insulating layer 156 can still be saved. For example, the driving electrode layer 152 and the touch-sensing layer 154 may be disposed on one side of the second substrate 120 that is distant from the display medium layer 130.

The driving electrode layer 152 and the touch-sensing layer 154 may be used together to sense touch positions. Specifically, the touch display device 100 may be manipulated in a touch-sensing mode. In the touch-sensing mode, the touch-sensing way may include supplying touch driving waveforms to the driving electrode layer 152 and reading the touch-sensing signals from the touch-sensing layer 154. When a user finger or a touch medium such as a touch pen press the touch screen of the touch display device 100, the electric field between the driving electrode layer 152 and the touch-sensing layer 154 changes and produces a corresponding touch-sensing signal. In this way, the touch position of the touch medium can be obtained by detecting the position where the touch-sensing signals change.

In manipulation of the touch-sensing mode, the pixel electrode layer 140 may be maintained floating while the force-sensing layer 160 may be supplied with a fixed voltage. Therefore, the state of the display medium layer 130 would not be easily changed in the manipulation of the touch-sensing mode, and which helps to keep the display quality normal. The fixed voltage may be a common voltage or a ground signal. In another embodiment, the force-sensing layer 160 may be maintained floating.

Referring to FIGS. 1C and 1D, the driving electrode layer 152 may include a plurality of driving electrodes 152E, and the touch-sensing layer 154 may include a plurality of touch-sensing electrodes 154E. In one embodiment, each of the driving electrodes 152E and each of the touch-sensing electrodes 154E are strip-like electrodes. Each of the driving electrodes 152E extends along a first direction D1 while each of the touch-sensing electrode 154E extends along a second direction D2, wherein the first direction D1 and the second direction D2 are crossed and may be, but not limited to, perpendicular to each other.

The driving electrodes 152E are not only used as driving electrodes for touch-sensing but also served as driving electrodes for force-sensing. Specifically, the touch display device 100 may be manipulated in a force-sensing mode. In the force-sensing mode, the method of sensing force may include supplying touch driving waveforms to the driving electrode layer 152 and reading the force-sensing signals from the force-sensing layer 160. When a user press the touch display device 100, the capacitance change between the force-sensing layer 160 and the driving electrode layer 152 can be used to measure the variation of the variable gap G and to calculate magnitude of the applied force or pressure. In other words, the touch display device 100 may utilize the mutual-capacitance type sensing method to perform force-sensing function.

In manipulation of the force-sensing mode, the pixel electrode layer 140 may be maintained floating. In this way, the state of the display medium layer 130 would not be easily changed in the manipulation of the force-sensing mode, and which helps to keep the display quality normal. Besides, in the force-sensing mode, the touch-sensing layer 154 may be supplied with a fixed voltage. The fixed voltage may be a common voltage or a ground signal. In another embodiment, the touch-sensing layer 154 may be maintained floating. Therefore, the influence of the finger capacitance on the mutual-capacitance type force detection could be shielded and the precision of the force detection can be improved. In one embodiment, the force-sensing electrode 160E may be covered by the driving electrode 152E such that the interference of the finger capacitance on the force-sensing electrode 160E could be shielded by the driving electrode 152E and the precision of the force detection could be improved.

Disposing the sensing elements including the touch electrode structure 150 and the force-sensing layer 160 inside the touch display device 100, i.e. in-cell disposition, not only improves the reliability of the entire device but also saves extra substrates and adhesive layers or fixing devices that may be required for disposing the force-sensing layer 160. Therefore, the thickness and manufacturing cost of the touch display device 100 can be effectively reduced.

The touch display device 100 may further include other elements according to different requirements. In one embodiment, the touch display device 100 may further include a plurality of first connecting wires L1, a plurality of second connecting wires L2, and a plurality of third connecting wires L3 to transmit or receive signals. Referring to FIGS. 1B to 1E, the first connecting wires L1 respectively connect to the driving electrodes 152E, each of the second connecting wires L2 connects two adjacent touch-sensing electrodes 154E arranged along the first direction D1, and each of the third connecting wires L3 connects the force-sensing electrodes 160E on the same line along the second direction D2. The wiring layout and/or the wiring width and/or the wiring density of the first connecting wires L1, second connecting wires L2, and/or third connecting wires L3 could be adjusted according to actual requirements and are not limited by the illustration of the FIGS. 1B to 1E.

The first connecting wires L1, second connecting wires L2, and third connecting wires L3 may be made of, but not limited to, metal to reduce resistance. Referring to FIG. 1E, the touch display device 100 may further include a black matrix layer 190 to increase the contrast of the touch display device 100 and shield those elements that are required to be concealed inside the touch display device 100. The black matrix layer 190 may be disposed on the second substrate 120 such as disposed between the touch electrode structure 150 and the second substrate 120. The black matrix layer 190 may include a plurality of shutter strips 192. The shutter strips 192 may be disposed to shield the third connecting wires L3 to prevent a user from perceiving the existence of the third connecting wires L3, and which enables the touch display device 100 to perform display, touch-sensing, and force-sensing functions without affecting visibility.

In one embodiment, the shutter strips 192 include a plurality of transverse shutter strips and a plurality of longitudinal shutter strips, wherein the transverse shutter strips and the longitudinal shutter strips are connected with one another to form a grid-like black matrix layer. The grid-like black matrix layer has a plurality of openings O each exposing partial region of at least one pixel electrode 140E. In one embodiment, the openings O of the black matrix layer 190 may further accommodate color filter patterns (not shown) of various colors to perform color filtering function.

The touch display device 100 is driven in a screen frame time period to implement one of the display mode, the touch-sensing mode, and the force-sensing mode. The screen frame time period may be one-sixtieth second. In the screen frame time period, the touch display device 100 can be manipulated to implement one or two or all of the display mode, touch-sensing mode, and force-sensing mode.

In one embodiment, the display mode, the touch-sensing mode, and the force-sensing mode may, but not limited to, be implemented separately or in a time-sharing manner. In another embodiment, the touch-sensing mode and the force-sensing mode may be manipulated simultaneously in the screen frame time period by, for example, floating the pixel electrode layer 140, supplying touch driving waveforms to the driving electrode layer 152, reading the force-sensing signals from the force-sensing layer 160, and reading the touch-sensing signals from the touch-sensing layer 154. On the other hand, the touch-sensing mode and the force-sensing mode may be manipulated separately or in a time-sharing manner in the screen frame time period. In this embodiment, the force-sensing layer 160 may be supplied with a fixed voltage or maintained floating when the touch display device is manipulated in the touch-sensing mode while the touch-sensing layer 154 may be supplied with a fixed voltage or maintained floating when the touch display device is manipulated in the force-sensing mode.

Referring to FIGS. 2 to 5, the force-sensing layer 160, the driving electrode layer 152, and the touch-sensing layer 154 in accordance with other embodiments of the claimed invention are shown, wherein the elements being same as or similar to the above-mentioned elements may be indicated with same or similar reference numerals and/or symbols and would not be described redundantly. FIGS. 2A to 2C are second kind of top views respectively illustrating force-sensing layer, driving electrode layer, and touch-sensing layer of the FIG. 1A. FIGS. 3A to 3C are third kind of top views respectively illustrating force-sensing layer, driving electrode layer, and touch-sensing layer of the FIG. 1A. FIGS. 4A to 4C are fourth kind of top views respectively illustrating force-sensing layer, driving electrode layer, and touch-sensing layer of the FIG. 1A. FIGS. 5A to 5C are third kind of top views respectively illustrating force-sensing layer, driving electrode layer, and touch-sensing layer of the FIG. 1A.

Figure 2A:
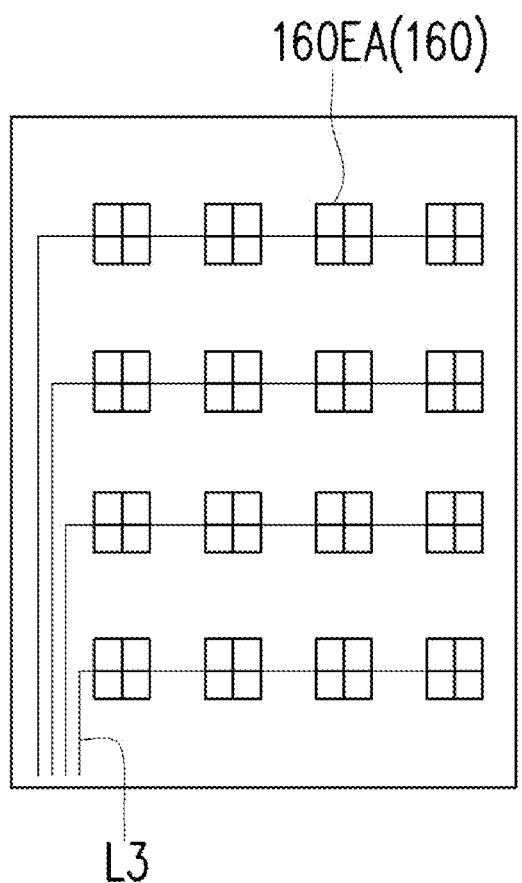
FIG. 2A to FIG. 2C are second kind of top views respectively illustrating force-sensing layer, driving electrode layer, and touch-sensing layer of the FIG. 1A.
Figure 2B:
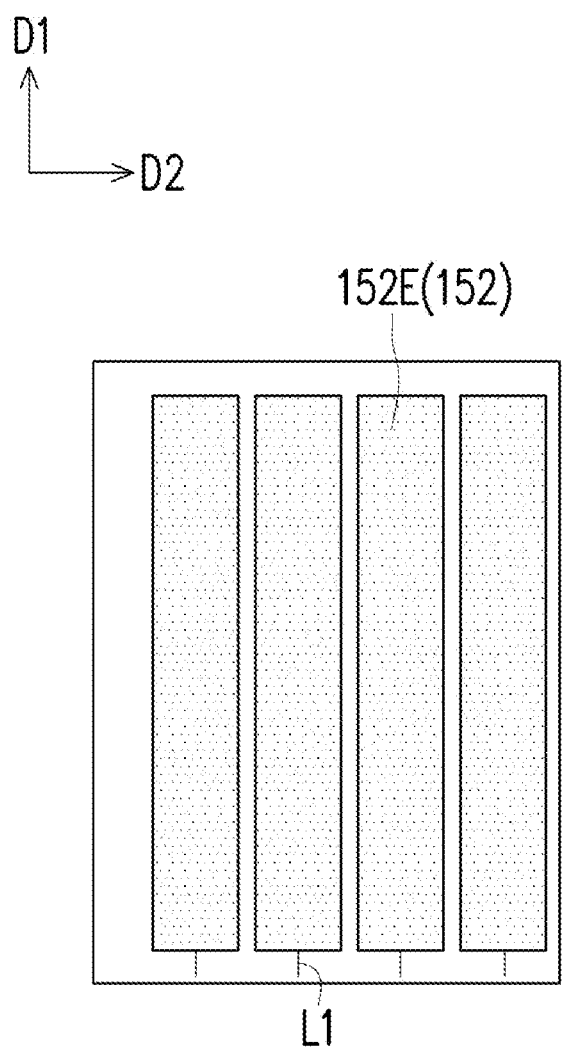
Figure 2C:
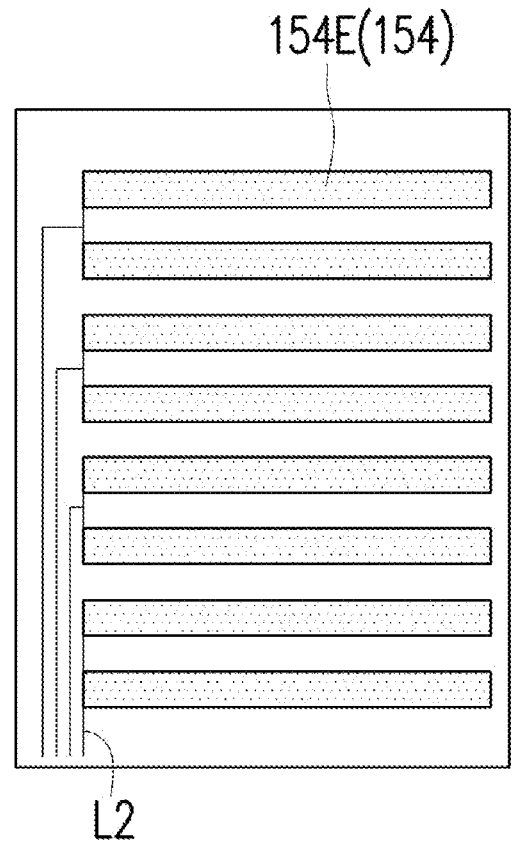

Referring to FIGS. 2A to 2C, in one embodiment, each of the force-sensing electrodes 160EA may be metal mesh electrodes. The shutter strips 192 shown in FIG. 1E may be used to shield the force-sensing electrodes 160EA to prevent a user from perceiving the existence of the force-sensing electrodes 160EA, and which enables the touch display device 100 to perform display, touch-sensing, and force-sensing functions without affecting visibility. In this embodiment, the force-sensing electrodes 160EA may be disposed along the scanning lines SL and the data lines DL without overlapping the pixel electrodes 140.

Figure 3A:
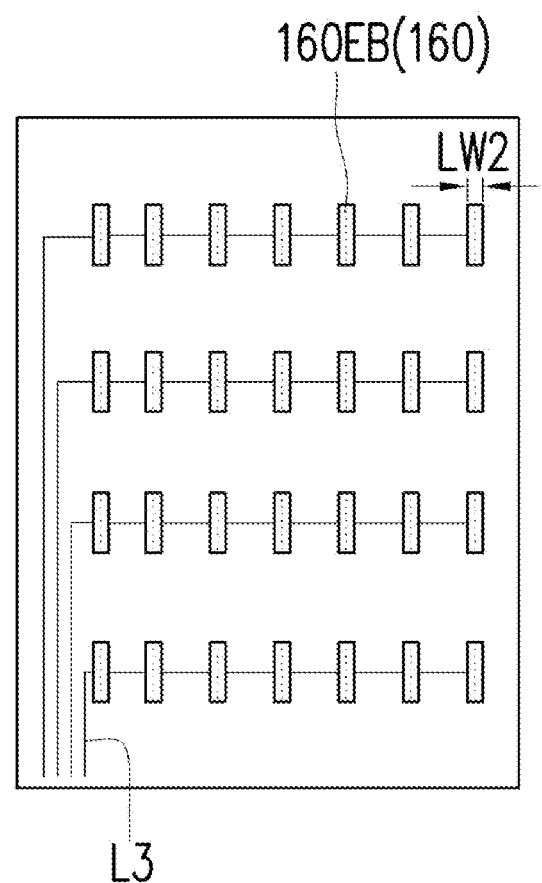
FIG. 3A to FIG. 3C are third kind of top views respectively illustrating force-sensing layer, driving electrode layer, and touch-sensing layer of the FIG. 1A.
Figure 3B:
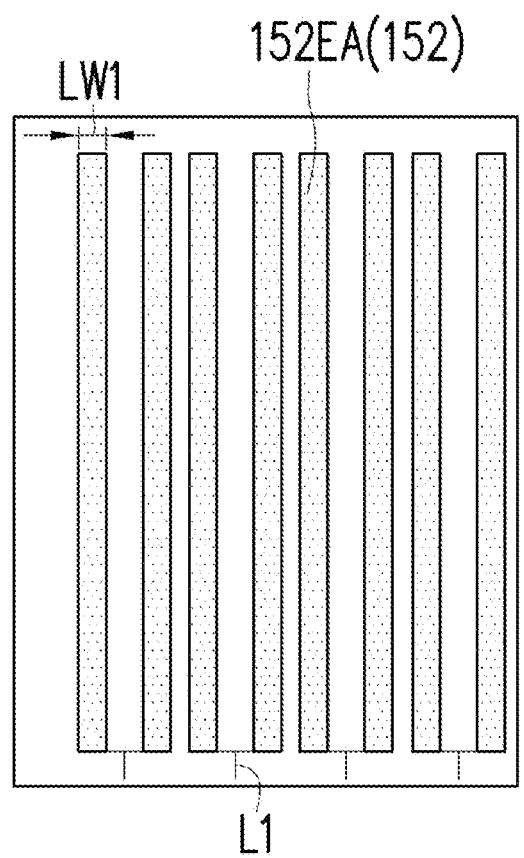
Figure 3C:
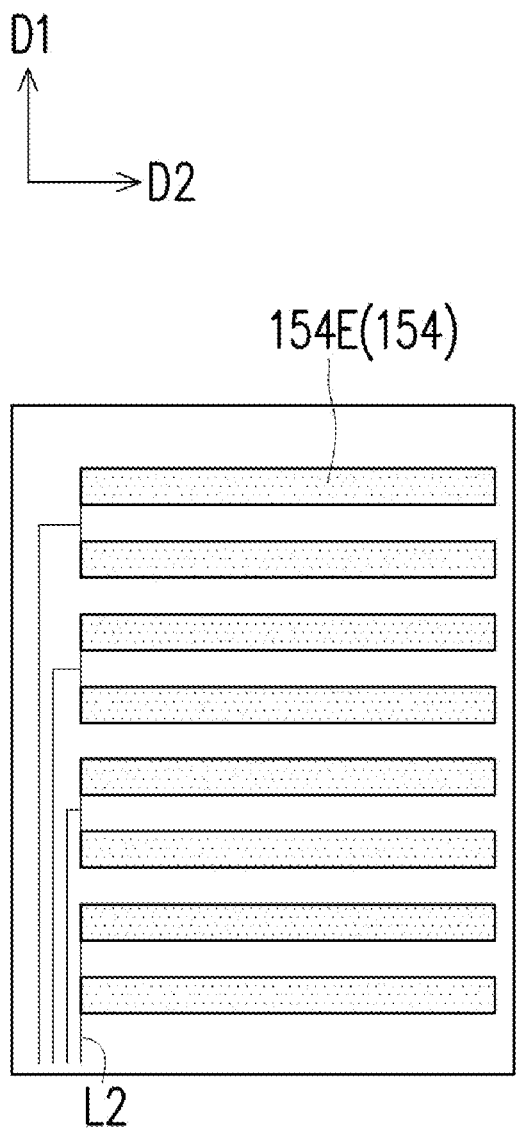

Referring to FIGS. 3A to 3C, in one embodiment, the line width LW1 of each of the driving electrodes 152EA along the second direction D2 becomes narrower, and each of the first connecting wires L1 connects in series two adjacent driving electrodes 152EA arranged along the second direction D2. In one embodiment, the line width LW2 of each of the force-sensing electrodes 160EB arranged along the second direction D2 may be adjusted to be narrower than the line width LW1 of each of the driving electrodes 152EA arranged along the second direction D2 such that the driving electrodes 152EA covers the force-sensing electrodes 160EB, respectively. In this way, the interference of the finger capacitance on the force-sensing electrodes 160EB could be shielded by the driving electrodes 152EA and the precision of the force detection could be improved.

Figure 4A:
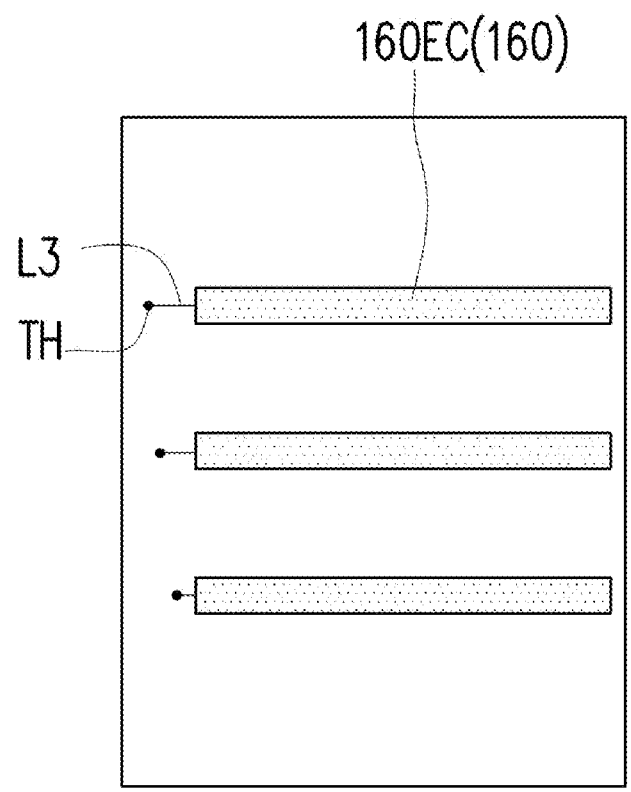
FIG. 4A to FIG. 4C are fourth kind of top views respectively illustrating force-sensing layer, driving electrode layer, and touch-sensing layer of the FIG. 1A.
Figure 4B:
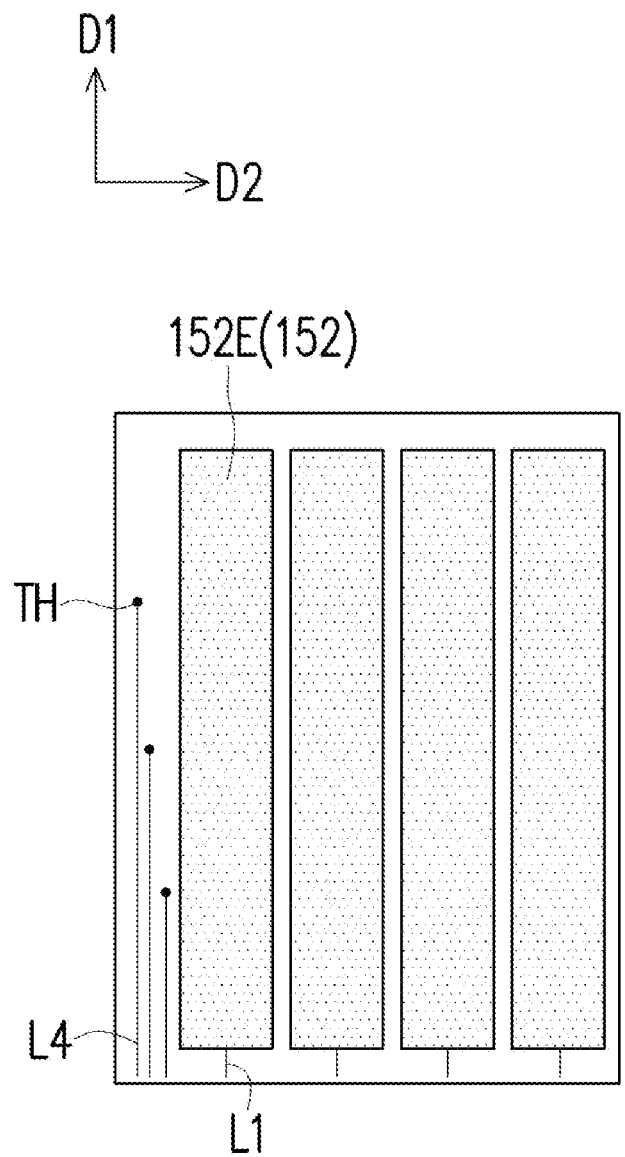
Figure 4C:
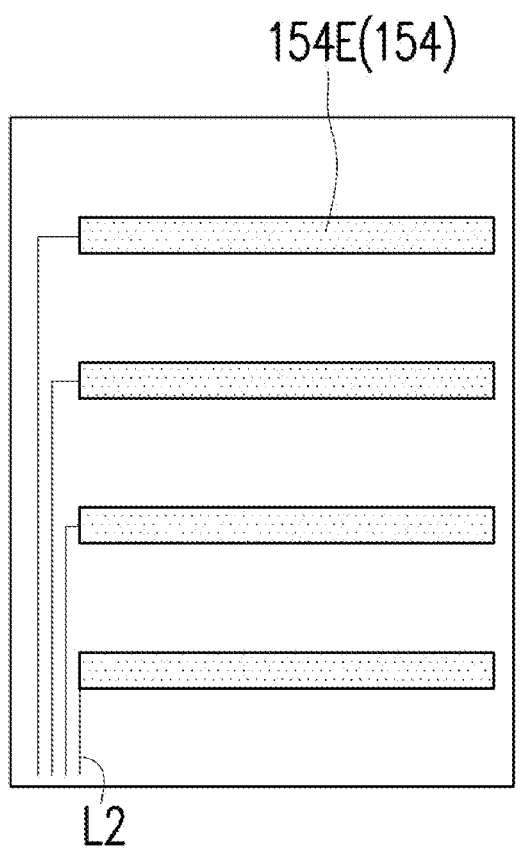

Referring to FIGS. 4A to 4C, in this embodiment, each of the force-sensing electrodes 160EC is strip-like electrode, and each of the force-sensing electrodes 160EC extends along the second direction D2. Besides, the second connecting wires L2 connects the touch-sensing electrodes 154E, respectively. In this embodiment, the touch-sensing electrodes 154E and the force-sensing electrodes 160EC are spaced and parallel to one another in arrangement such that the touch-sensing electrodes 154E and the force-sensing electrodes 160EC are not overlapped with one another. In other words, the arrangement of the touch-sensing electrodes 154E enables exposure of the force-sensing electrodes 160EC.

In the embodiments of FIGS. 1 to 3, the driving electrodes 152E (or the driving electrodes 152EA), the touch-sensing electrodes 154E, and the force-sensing electrodes 160E (or the force-sensing electrodes 160EA, 160EB) are connected to different control circuits (not shown) via the first connecting wires L1, the second connecting wires L2, and the third connecting wires L3, respectively. The invention, however, is not limited herein. In one embodiment, the touch display device may further include a plurality of conductive bumps TH and a plurality of fourth connecting wires L4 as shown in FIGS. 4A, 4B, 5A and 5B. The conductive bumps TH may be disposed between the driving electrode layer 152 and the force-sensing layer 160. The fourth connecting wires L4 may be disposed on the same layer on which the first connecting wires L1 are disposed, and the fourth connecting wires L4 and the first connecting wires L1 may be connected to the same control circuit. Each of the conductive bumps TH connects one of the third connecting wires L3 and one of the fourth connecting wires L4. In this way, the control circuits (not shown) for separately controlling the force-sensing layer 160 and the driving electrode layer 152 may be integrated together, and each of the force-sensing electrodes 160EC on the force-sensing layer 160 may be connected to the control circuits via the corresponding third connecting wires L3, the conductive bumps TH, and the fourth connecting wires L4.

Figure 5A:
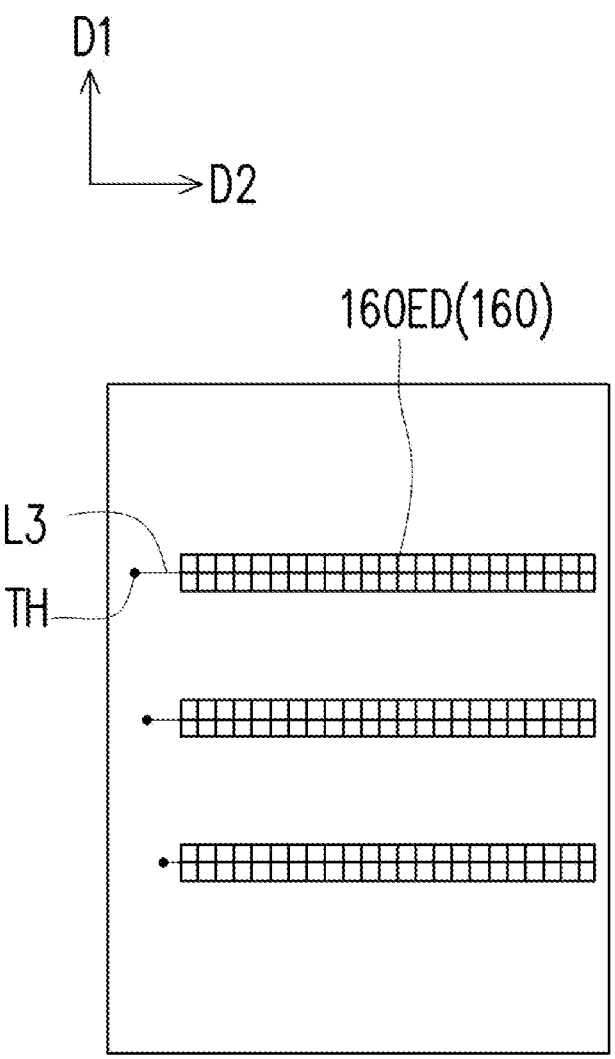
FIG. 5A to FIG. 5C are fifth kind of top views respectively illustrating force-sensing layer, driving electrode layer, and touch-sensing layer of the FIG. 1A.
Figure 5B:
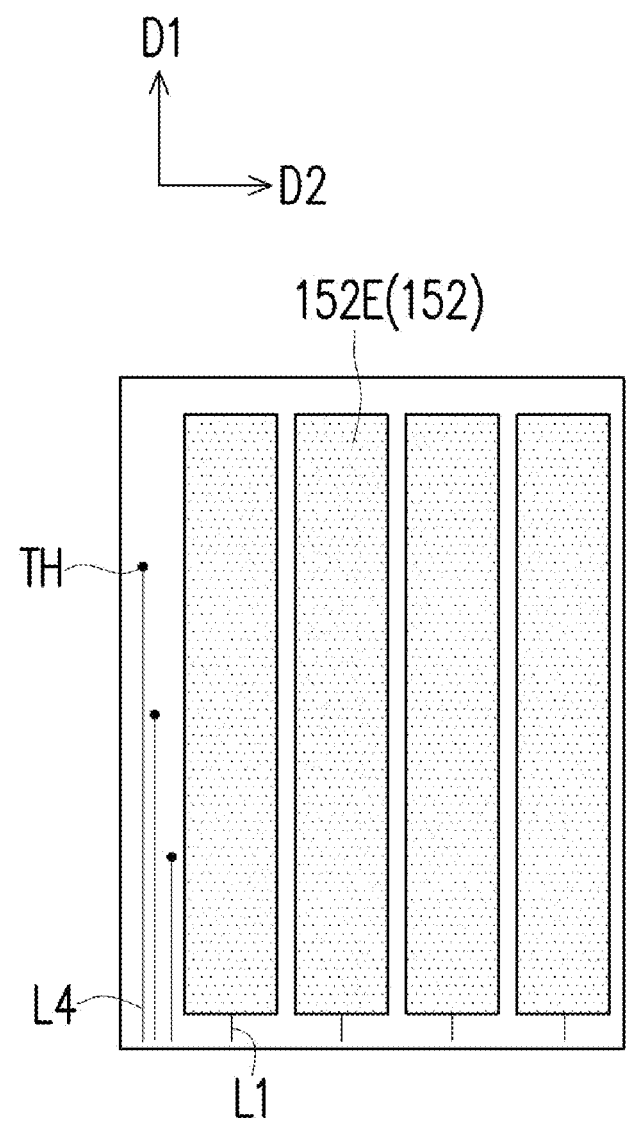
Figure 5C:
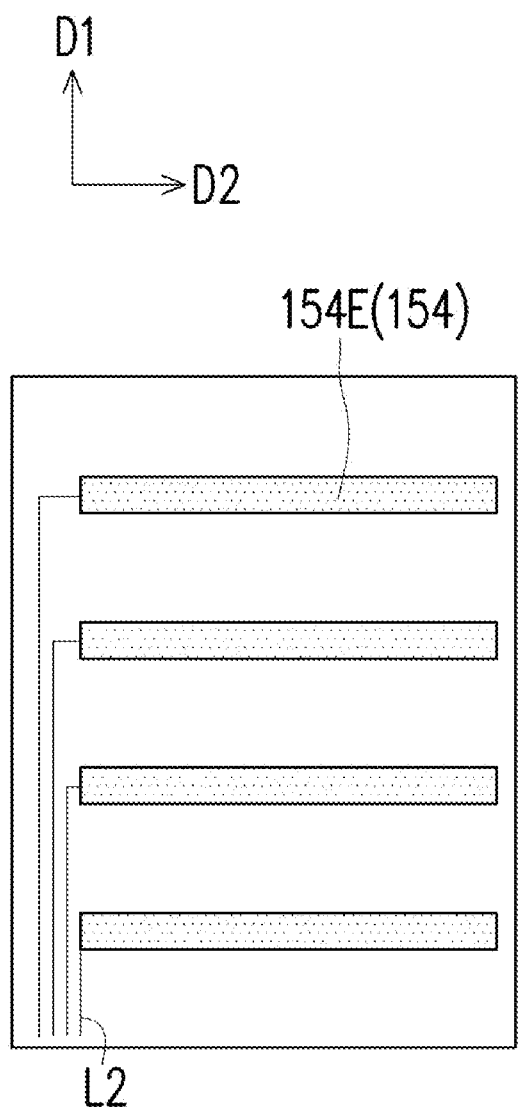

Referring to FIGS. 5A to 5C, in this embodiment, each of the force-sensing electrodes 160ED may be metal mesh electrodes and may be disposed along the scanning lines SL and the data lines DL without overlapping the pixel electrodes 140. The force-sensing electrodes 160ED may be shielded by the shutter strips 192 as shown in FIG. 1E to prevent a user from perceiving the existence of the force-sensing electrodes 160ED, and which enables the touch display device to perform display, touch-sensing, and force-sensing functions without affecting visibility.

In sum, the disclosed touch display device has in-cell sensing elements including the touch-sensing electrode structure and/or the force-sensing layer, which not only raises the reliability of the entire device but also effectively reduces the thickness and manufacturing cost of the touch display device. Moreover, a method of driving the touch display device is disclosed.

Having described at least one of the embodiments of the claimed invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents. Specifically, one or more limitations recited throughout the specification can be combined in any level of details to the extent they are described to accomplish the touch display devices.

What is claimed is:

1. A touch display device, comprising:
    a first substrate on which a force-sensing layer including a plurality of force-sensing electrodes is disposed;
    a second substrate arranged to opposite face the first substrate with a touch electrode structure including a driving electrode layer and a touch-sensing layer being disposed on the second substrate, the driving electrode layer including a plurality of driving electrodes each extending along a first direction while the touch-sensing layer including a plurality of touch-sensing electrodes each extending along a second direction which is perpendicular with the first direction;
    a display medium layer disposed between the first substrate and the second substrate; and
    a pixel electrode layer disposed between the display medium layer and the first substrate;
    wherein each of the driving electrodes covers more than one of the force-sensing electrodes such that the driving electrodes shield the force-sensing electrodes;
    wherein the force-sensing layer faces the driving electrode layer and a variable gap exists across the display medium layer and between the force-sensing layer and the driving electrode layer; and
    wherein the force-sensing layer and the pixel electrode layer are used to drive the display medium layer, the driving electrode layer and the touch-sensing layer are used to sense touch positions, and the driving electrode layer and the force-sensing layer are used to sense a touch force.

2. The touch display device of claim 1, wherein the pixel electrode layer includes a plurality of pixel electrodes, and each of the force-sensing electrodes overlaps more than one of the pixel electrodes.

3. The touch display device of claim 1, wherein each of the force-sensing electrodes extend along the second direction.

4. The touch display device of claim 3, wherein the force-sensing electrodes are served as common electrodes to drive the display medium layer.

5. The touch display device of claim 4, wherein the arrangement of the touch-sensing electrodes enables exposure of the force-sensing electrodes.

6. The touch display device of claim 3, wherein the force-sensing electrodes include a mesh configuration.

7. The touch display device of claim 6, further comprising:
    a black matrix layer disposed on the second substrate, wherein the black matrix layer includes a plurality of shutter strips and the force-sensing electrodes are shielded by the shutter strips.

8. The touch display device of claim 1, further comprising: a backlight module, wherein the first substrate is disposed between the second substrate and the backlight module.

9. The touch display device of claim 1, wherein the driving electrode layer is disposed between the touch-sensing layer and the display medium layer.

10. The touch display device of claim 9, wherein the touch-sensing layer is disposed on one side of the second substrate which is distant from the display medium layer.

11. A driving method of touch display device, comprising:
    providing a touch display device including a first substrate, a second substrate, a display medium layer, a pixel electrode layer, a touch electrode structure, and a force-sensing layer; wherein the second substrate opposite faces the first substrate, the display medium layer is disposed between the first substrate and the second substrate, the pixel electrode layer is disposed between the display medium layer and the first substrate, the touch electrode structure is disposed on the second substrate and includes a driving electrode layer and a touch-sensing layer, the force-sensing layer is disposed on the first substrate and faces the driving electrode layer, wherein a variable gap exists across the display medium layer and between the force-sensing layer and the driving electrode layer, the force-sensing layer and the pixel electrode layer are used to drive the display medium layer, the driving electrode layer and the touch-sensing layer are used to sense touch positions, the driving electrode layer and the force-sensing layer are used to sense a touch force, the force-sensing layer includes a plurality of force-sensing electrodes, the driving electrode layer includes a plurality of driving electrodes each extending along a first direction, the touch-sensing layer includes a plurality of touch-sensing electrodes each extending along a second direction which is perpendicular with the first direction, each of the driving electrodes covers more than one of the force-sensing electrodes such that the driving electrodes shield the force-sensing electrodes, and the touch display device includes a display mode, a touch-sensing mode, and a force-sensing mode; and
    implementing one of the display mode, the touch-sensing mode, and the force-sensing mode in a screen frame time period.

12. The driving method of claim 11, wherein the display mode, the touch-sensing mode, and the force-sensing mode are implemented separately.

13. The driving method of claim 11, wherein the touch-sensing mode and the force-sensing mode are implemented separately in the screen frame time period.

14. The driving method of claim 11, wherein the touch-sensing mode and the force-sensing mode are implemented simultaneously in the screen frame time period.

15. The driving method of claim 14, wherein the step of implementing simultaneously the touch-sensing mode and the force-sensing mode in the screen frame time period includes:
    floating the pixel electrode layer;
    supplying a touch driving waveform to the driving electrode layer;
    reading a force-sensing signal from the force-sensing layer; and
    reading a touch-sensing signal from the touch-sensing layer.

16. The driving method of claim 11, wherein the step of implementing the display mode includes:
    providing a display driving waveform to the pixel electrode layer; and
    supplying a common voltage to the force-sensing layer.

17. The driving method of claim 16, wherein the step of implementing the display mode further includes:
    supplying a common voltage to the driving electrode layer.

18. The driving method of claim 11, wherein the step of implementing the touch-sensing mode includes:
   floating the pixel electrode layer;
   supplying a touch driving waveform to the driving electrode layer;
   supplying a fixed voltage to the force-sensing electrode layer or floating the force-sensing layer; and
   reading a touch-sensing signal from the touch-sensing layer.

19. The driving method of claim 11, wherein the step of implementing the force-sensing mode includes:
   floating the pixel electrode layer;
   supplying a touch driving waveform to the driving electrode layer;
   supplying a fixed voltage to the touch-sensing electrode layer or floating the touch-sensing layer; and
   reading a force-sensing signal from the force-sensing layer.

\* \* \* \* \*